(12) United States Patent
Silvers

(10) Patent No.: US 9,506,795 B2
(45) Date of Patent: Nov. 29, 2016

(54) WIRELESS TANK LEVEL MONITORING

(71) Applicant: SILVERSMITH, INC., Gaylord, MI (US)

(72) Inventor: David Silvers, Mancelona, MI (US)

(73) Assignee: SILVERSMITH, INC., Gaylord, MI (US)

( * ) Notice: Subject to any disclaimer, the term of this patent is extended or adjusted under 35 U.S.C. 154(b) by 0 days.

(21) Appl. No.: 14/674,865

(22) Filed: Mar. 31, 2015

(65) Prior Publication Data

US 2015/0287313 A1    Oct. 8, 2015

Related U.S. Application Data

(60) Provisional application No. 61/976,044, filed on Apr. 7, 2014.

(51) Int. Cl.
*E21B 47/04* (2012.01)
*G01F 23/00* (2006.01)
*H04B 7/00* (2006.01)
*H04L 25/44* (2006.01)

(52) U.S. Cl.
CPC ................................ *G01F 23/0015* (2013.01)

(58) Field of Classification Search
CPC .................................................... G01D 4/002
See application file for complete search history.

(56) References Cited

U.S. PATENT DOCUMENTS

| | | | |
|---|---|---|---|
| 4,275,382 A * | 6/1981 | Jannotta | G01F 23/18 137/386 |
| 6,369,715 B2 | 4/2002 | Bennett, Jr. et al. | |
| 6,678,255 B1 * | 1/2004 | Kuriyan | H04Q 9/00 370/310 |
| 6,762,679 B1 * | 7/2004 | Diaz | G01F 15/063 340/524 |
| 6,967,589 B1 | 11/2005 | Peters | |
| 7,337,078 B2 | 2/2008 | Bond et al. | |
| 7,562,570 B2 | 7/2009 | Peters | |
| 8,223,027 B2 | 7/2012 | Jenkins et al. | |
| 2006/0033631 A1 | 2/2006 | Cupples et al. | |
| 2007/0285311 A1 * | 12/2007 | Abraham | G01S 5/0036 342/357.62 |
| 2010/0001867 A1 * | 1/2010 | Rodrigue | G01F 23/62 340/618 |
| 2013/0181829 A1 * | 7/2013 | Schnitz | G06Q 10/08 340/539.1 |
| 2013/0293388 A1 * | 11/2013 | Ingalsbe | G01D 4/002 340/870.02 |

* cited by examiner

*Primary Examiner* — Travis Hunnings
*Assistant Examiner* — Pameshanand Mahase
(74) *Attorney, Agent, or Firm* — McGarry Bair PC

(57) ABSTRACT

A tank level monitoring system with wireless transmission capability. The monitoring system includes a wireless tank monitor for level sensing and connected to one or more float level switches. The system regularly measures the level of fluid in a tank, but may change the measurement rate based upon the float switch. This system actively monitors conditions of a tank and alerts a user when conditions exceed a predetermined parameter.

11 Claims, 5 Drawing Sheets

WIRELESS TANK LEVEL MONITORING

This application claims the benefit of U.S. Provisional Patent Application No. 61/976,044, filed Apr. 7, 2014, which is incorporated herein by reference in its entirety.

FIELD OF THE INVENTION

This invention relates to storage tank monitoring. In one of its aspects, the invention relates to monitoring the level of liquid in oil well storage tanks. Oils or liquids that may be stored include but are not limited to black oils, volatile oils, gas condensates, water, or any other type of liquid. In another of its aspects, the invention relates to wireless monitoring of liquid storage tanks from a remote location.

BACKGROUND

Battery operated, wireless monitoring of well tanks from a remote monitoring location have been used in Class 1 Division 1 locales. Tanks in the remote locations may store any type of contents such as hazardous materials such as oil or gasoline, or may store a multitude of chemicals or any other content which may be desirable to store at a remote location.

Classes and Divisions break down storage by content type. Different classes and division require different types and requirements of monitoring. For example, extremely combustible contents may require very specific and careful monitoring while more stable contents will have less strict monitoring requirements. Extremely hazardous material monitoring may require an electric monitor without any electric sparking or a securely enclosed electric system which may otherwise trigger a reaction.

In an event where a tank may have a spill or overflow, there may critical consequences to the tank storage area or local environment. Monitors are known with an alert function, but may not alert a data collection center as the spill or overflow may be imminent, before a critical situation may occur.

Classically, human monitoring has been used to monitor tanks with hazardous materials, but human monitoring may be very dangerous. A wireless monitoring system is advantageous, but batteries to power the monitoring systems will still need to be periodically replaced by a human worker. Extending battery life is important, reducing the frequency in which a battery needs to be changed. Conversely, a monitoring system may be limited by the programming to readings by specific times or intervals, where a human monitoring system may be more accurate or incident driven.

For example, Peters et al. U.S. Pat. No. 6,967,589 discloses a method of monitoring the level of tanks at a gas or oil well site with a level sensor that is coupled to a transceiver to report the level of liquid in the tanks upon request. The sensor is programmed to 'wake up' to report the level of liquid in the tanks when the transceiver is operational for 32 milliseconds (ms) every 4 seconds. In addition, sensor reads can take place every 100 ms for three minutes resulting in 1800 reads. The monitor 'sleeps' between 'wake-ups,' operating on little or no power, thus saving battery life. The monitoring unit can send an alarm signal to wake up the transceiver when the level of the liquid reaches a predetermined level during the 32 ms operational period.

Jenkins et al. U.S. Pat. No. 8,223,027 discloses a system for wirelessly monitoring tank levels by the use of a low-Earth orbit (LEO) satellite. The tank monitors wirelessly communicate with the satellite through a nearby satellite gateway. The monitors on the tank have a four-hour transmission interval, and are battery powered. A data collection center receives readings that can be used to provide an alarm for each individual tank. The power required to make a transmission to a satellite is significantly greater than that for a local transmission.

Bennett, Jr. et al U.S. Pat. No. 6,369,715 discloses a wireless system for monitoring tank farms wherein a transmitter with an antenna attaches to a separate level sensor by wire. The transmitter sends readings of the level sensor every 30 seconds or at a predetermined interval. The level sensor may also include an alarm switch to instruct the transmitter to broadcast an alarm signal.

The frequency of the sampling is important in order to detect any malfunction, spill, or overflow in the oil production, transmission, or storage so that any problem such as a leak or overfilling can be detected promptly and corrected quickly, or even detected before it occurs. The reality is that the malfunctions, spills, or overflows are infrequent and a high frequency sampling requires a lot of battery power. Generally, tanks and wells are in remote locations with no electrical service and battery power must be used. Furthermore, hazardous locales may require a low power monitoring system, such as battery power, where electricity may be too dangerous to run or use. There must be a balance struck between the frequency of monitoring and battery life.

SUMMARY OF THE INVENTION

According to the invention, a wireless tank monitor assembly comprises a level sensor configured to measure the level of liquid in a tank, one or more float sensors that are responsive to one or more predetermined level of liquid in the tank, a switch coupled to the or each float sensors, a controller coupled to the level sensors and switch or switches and a transmitter for communicating sensor measurements to a remote location. The controller is programmed to sleep and to wake up at predetermined intervals and to transmit a data packet wirelessly to a remote location at which data is monitored and stored. In addition, the controller is also programmed to wake up when the level of liquid in the tank reaches one or more predetermined level.

Further according to the invention, a method of monitoring a level of fluid in a tank in a remote location and reporting the level of fluid in the tank to a data collection center, comprising steps of: periodically measuring the level of fluid in the tank at a predetermined frequency; transmitting data packets representative of the level of fluid in the tank to the data collection center at the predetermined frequency; detecting a condition in the tank when the fluid is at least one of above a predetermined upper level and below a predetermined lower level: and increasing the frequency of the measuring the level of fluid in the tank and increasing the frequency of transmitting the data packets when the detected condition is one of above the predetermined upper level and below a predetermined lower level.

In one embodiment, the data packets can be transmitted wirelessly.

In another embodiment, the periodic measuring act and the detecting a condition act are carried out by different instruments.

Still further according to the invention, a wireless tank monitoring system for monitoring the level of fluid in a tank and reporting the level of fluid in a tank to a data collection center at a remote location comprises a level sensor mounted in the tank for sensing the level of a fluid in the tank; a processor having a normal sleep mode and an awake mode, and connected to the level sensor for generating, when awake, data packets representative of the level of a fluid in the tank at a given time as determined by the level sensor; a transmitter connected to the processor and configured to transmit the data packets generated by the processor to the data collection center; and a timer connected to the processor and configured to change the mode of the processor to an awake mode at a predetermined frequency to generate data packets representative of the level of fluid in the tank; and at least one limit sensor connected to the processor, mounted to the tank and configured to detect and communicate to the processor a rise of the liquid level in the tank above an upper predetermined level or a fall of the liquid level in the tank below a lower predetermined level. The processor is programmed to change to the frequency of the awake mode of the processor in response to a communication from the at last one limit sensor that the level of liquid in the tank is either above the upper predetermined level or below the lower predetermined level.

In one embodiment, the at least one monitor may be mounted to the upper or lower portion of the tank.

In another embodiment, the predetermined frequency of the awake mode may be increased when the level of fluid in the tank is above an upper predetermined level or below a lower predetermined level. A battery may be connected to the processor to provide power the processor. In addition, the limit sensor may be a float sensor.

In another embodiment, the transmitter can be configured for wireless communication. The monitoring system may include a wireless transceiver for receiving command signals from the data collection center. Further, the processor may be configured to change the mode of the processor to an awake mode with command signals from the data collection center; and the processor may be configured to generate data packets representative of the level of fluid in the tank and transmit the data packets to the data collection center.

DETAILED DESCRIPTION

Figure 1:
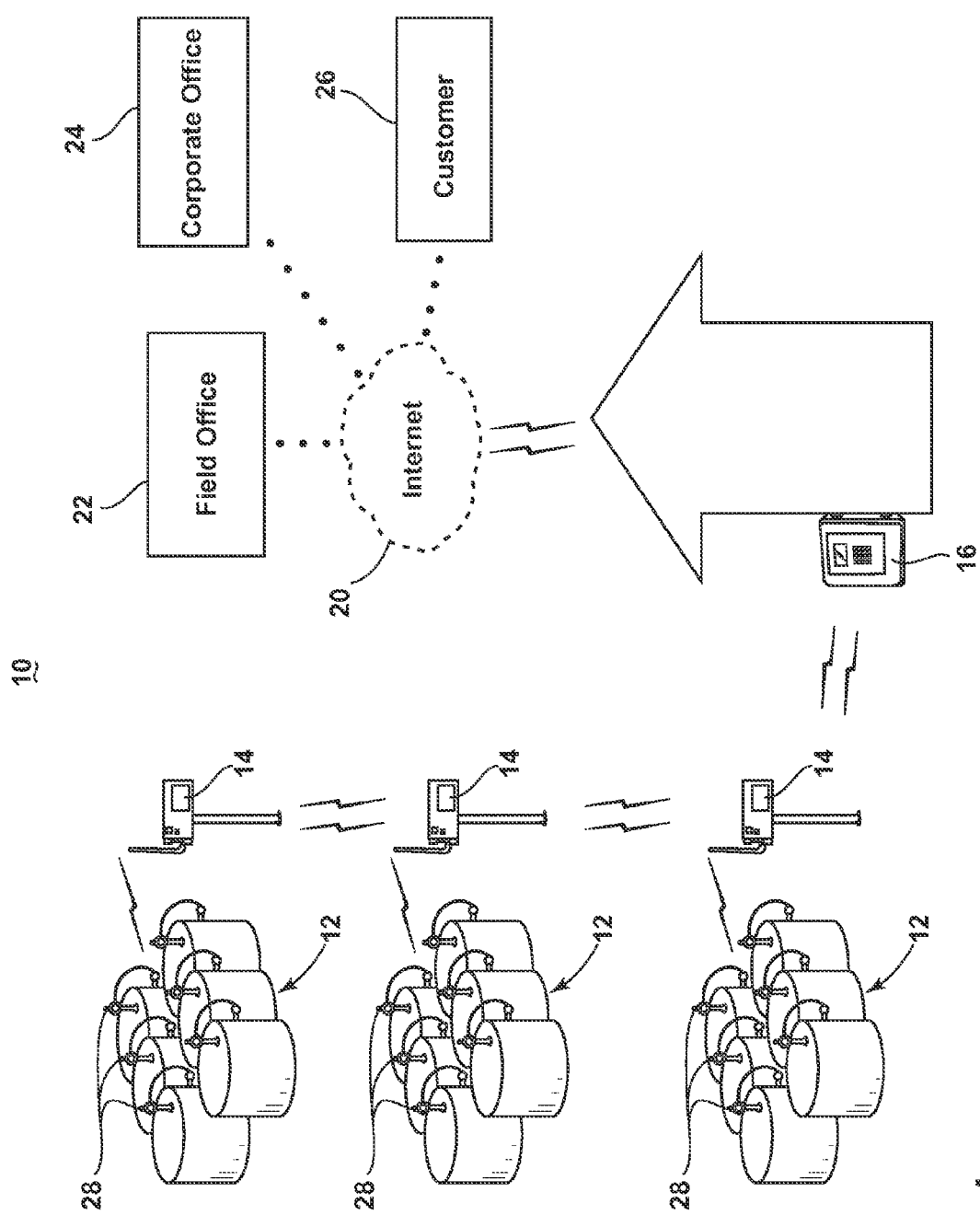
FIG. 1 is a schematic view of an oil well farm with a wireless tank monitoring system according to the invention.

In the background and the following description, for the purposes of explanation, numerous specific details are set forth in order to provide a thorough understanding of the technology described herein. It will be evident to one skilled in the art, however, that the exemplary embodiments may be practiced without these specific details. In other instances, diagrams show structures and devices facilitating description of the exemplary embodiments of the invention.

References to the drawings describe the exemplary embodiments. These drawings illustrate certain details of specific embodiments that implement an apparatus, method, or product described herein. However, the drawings should not impose any limitations that may be present in the drawings. The module, method, or product may be any sensing apparatus or transmission product and implementation thereof for accomplishing intended monitoring operations.

Referring now to the drawings and FIG. 1 in particular, clusters of tanks 12 are arranged in a remote location from a data collection center. The tanks 12 may be located in an oil field that has multiple oil wells that pump oil from a subterranean stratum into the tanks 12 adjacent to each well. The tanks 12 are connected to a tank monitoring system 10 that may include a wireless tank monitor assembly 28, a monitor link 14, a communication controller 16, the internet 20 or any non-licensed communication frequency, a field office data collection center 22, a corporate data collection center 24, and customer servers 26. The tank monitoring system 10 may be implemented anywhere tank monitoring is utilized. Specific examples include an oil well system or a large tank farm storage facility.

In a preferred embodiment and common in the industry, tank assemblies 28 consist of groups of six, cylindrical tanks, typically twenty foot tall. Other embodiments may contain any number of tanks 12 and may be any size or shape, such as, a sphere, ellipsoid, or abstract shape.

Each tank 12 is equipped with a wireless tank monitor assembly 28 that has a transmitter that is capable of wireless communication. The wireless tank monitor assemblies 28 have transmitters that preferably communicate by radio frequency in the 900 MHz ISM radio band, but other frequencies and transmission types such as WiMax, WiFi, cellular network, or satellite transmission may be used. The 900 MHz ISM radio band is optimal, having a strong enough signal for accurate communication while only requiring minimal power to send the signal. 1

A monitor link 14 is located near the tanks 12, but preferably far enough to be located out of an immediate hazardous area. The tank monitoring system 10 may include any number of monitor links 14, as needed by the number of tanks 12 or size of the monitored area. The monitor links 14 have transceiver capabilities, receiving information transmitted from nearby tank monitor assemblies 28, or sending information to a nearby tank monitor assembly 28. Furthermore, in an additional embodiment, the monitor links 14 may communicate directly to a tank monitor assembly 28 or through a hopping-chain of monitor links 14 where a signal is transmitted to at least one additional monitor link 14 before being transmitted to or from a tank monitor assembly 28. In an exemplary embodiment, the monitor link 14 can be a Silversmith, Inc. ERose Link and can implement a data packet transport and delivery system. WO2014/043430 DATA PACKET TRANSPORT AND DELIVERY SYSTEM AND METHOD is exemplary of a data packet transport and delivery system that may be used in the invention.

The communication controller 16 is an on-site remote control unit preferably housed in or near a control building. In a preferred embodiment, the Silversmith, Inc. HiTech controller is used. This communication controller 16 acts as a central hub for all monitor links 14 in the tank monitoring system 10. The communication controller 16 has the capability to send data to and receive data from the monitor links 14 as well as collect data from each specific wireless tank monitor assembly 28. The communication controller 16 may send a signal to a monitor link 14 relay and ultimately to a tank 12 for a reading specific to that tank 12. This may be advantageous in response to an alert signal, or even the event where data may be missing.

The implementation of the monitor links 14 and the communication controllers 16 may create a network topography such that monitor links 14 out of range of a communication controller 16 will still be able to communicate through a topographical chain of monitor links 14 as described in the aforementioned WO publication.

The communication controller 16 can also have the capability to transmit its collected data packets remotely. This transmission preferably occurs over an internet 20 connection, but may occur over a different connection such as a satellite, cellular network, or radio frequency. The communication controller 16 transmits the information to any desired data collection center. Examples of data collection centers include, but are not limited to, a field office 22, a corporate office 24, and a customer interface 26.

Figure 2:
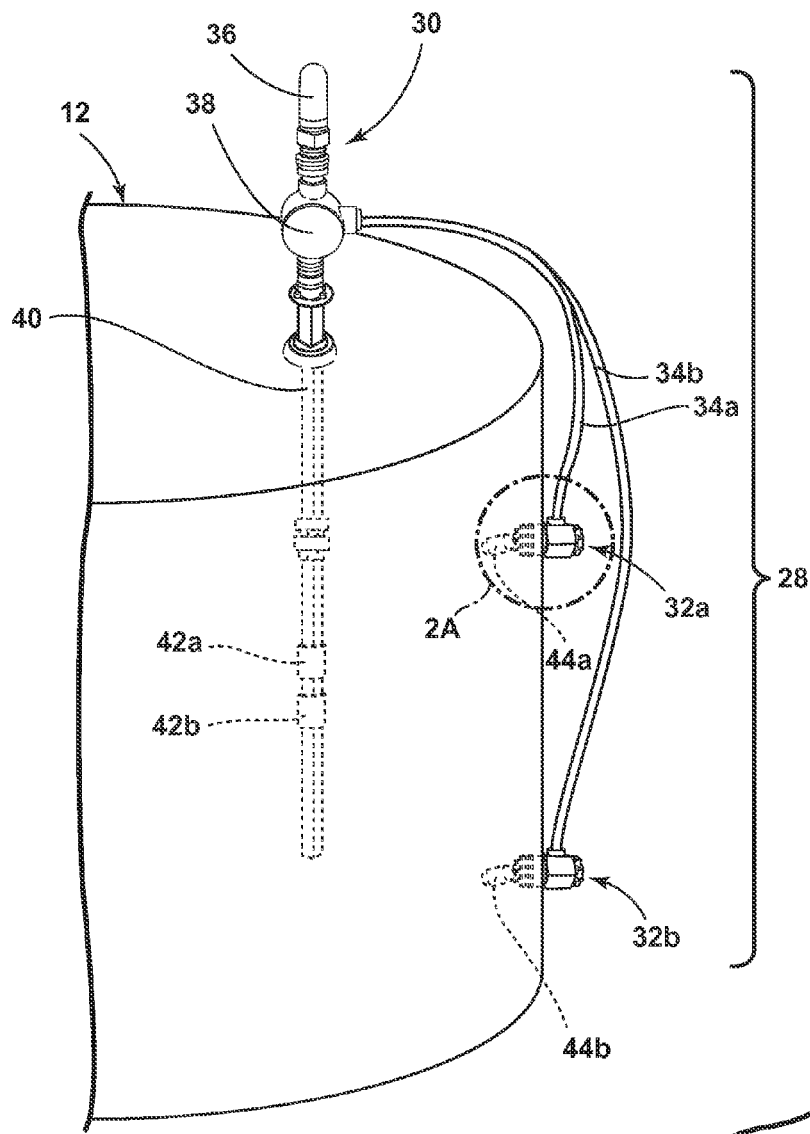
FIG. 2 is a partial perspective view of a tank with a wireless tank monitor assembly according to the invention installed on the tank.
Figure 2A:
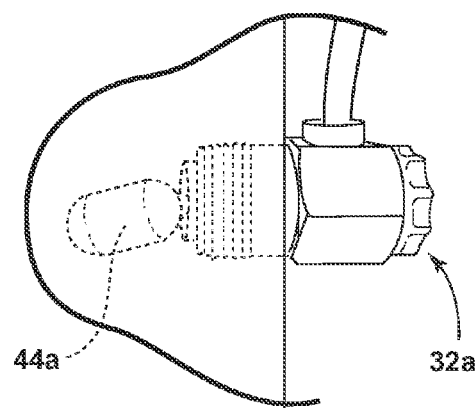
FIG. 2A is a detail view of one of the float sensors of the wireless tank monitor assembly of FIG. 2.

Referring now to FIG. 2, the wireless tank monitor assembly 28 comprises a monitor unit 30 disposed on the top of the tank 12 and two switches 32a and 32b on the side of the tank 12.

In a preferred embodiment, the top and bottom surfaces of the tank 12 are flat, similar to the cylindrical shapes shown in FIG. 1 and FIG. 2. The monitor unit 30 preferably mounts at the top of the tank, axially above the tank's 12 lowest point, enabling liquid measurement until the tank 12 is very near empty. Mounting the monitor unit 30 at the highest point not only provides more accurate sensor readings, but has less obstructions for a wireless signal connection to the monitor link 14 or any other signal relay device. In other embodiments, particular circumstances may require a monitor unit to mount on areas of the tank that are lower than the highest point.

The monitor unit 30 is preferably implemented with a magnetic, reed-switch style, level sensor equipped with one or more floats 42a, 42b, but may be implemented with any number or style of sensors such a pressure, temperature, humidity, or other sensor. In an exemplary embodiment, the wireless tank monitor assembly 28 implements the Siemens Model 2100 Digital Level Sensor. In lieu of the Siemens level sensor, a radar measuring system can be used. A suitable radar sensor is the VEGAPLUS 61, 62 or 63, made by Vega America, Cincinnati, Ohio.

The limit sensors 32a and 32b mount on the side of the tank 12 at different predetermined height locations, preferably having two limit sensors 32a, 32b in an upper portion and a lower portion of the tank 12. In the embodiment shown, the limit sensors 32a, 32b connect to knobs 44a, 44b, respectively, within the tank 12 and are responsive to the position of the knobs 44a, 44b being opened or closed depending on the liquid level inside the tank 12. The knobs 44a, 44b are preferably hollow, floating in response to the rise of a density specific liquid. For example, the upper limit sensor 32a will send a signal to the monitor unit 30 when the level of liquid in the tank rises above an upper predetermined level and the lower limit sensor 32b will close when the level of liquid in the tank 12 falls below a lower predetermined level. The signals sent to the monitor unit 30 are useful in operating the monitor unit based upon the level of fluid in the tank 12. In an exemplary embodiment, the limit sensors 32a, 32b are two Murphy MLS Liquid Level Switches at heights of five and fifteen feet on a twenty-foot tank 12 although the tank 12 may implement one or more limit sensors depending on the level or levels of liquid that are desirable to be monitored.

The limit sensors 32a, 32b connect to the monitor housing 38 by wires 34a, 34b. The monitor unit 30 is programmed to respond to the signal sent from the limit sensors 32a, 32b. In one embodiment, the limit sensors 32a, 32b may signal the monitor unit 30 to transmit an alarm signal.

Further, as certain embodiments may require, a limit sensors 32a, 32b may be disposed at the upper and lower predetermined positions. When the level in the tank 12 is below the upper predetermined position, the knob 44a will hang at a neutral position. If the liquid level in the tank 12 rises above upper predetermined position, the knob 44a will attempt to float upward, resulting in a upward position The limit sensor 32a will send a signal to the monitor unit 30 to begin to operate as related to the signal from the limit sensor 32a. In one embodiment, the monitor unit 30 will send a data packet reporting the upper level of liquid in the tank 12 has been reached. Similarly, if a tank 12 has a limit sensor 32b installed at the lower predetermined level, the knob 44b will attempt to float upward and remain at a neutral position until the level of liquid in the tank 12 is below the lower predetermined level. As the liquid level in the tank 12 falls below a lower predetermined level, the knob 44b will drop and the limit sensor 32b will send a signal to the monitor unit 30, which will begin to operate as related to the signal from the limit sensor.

Figure 3:
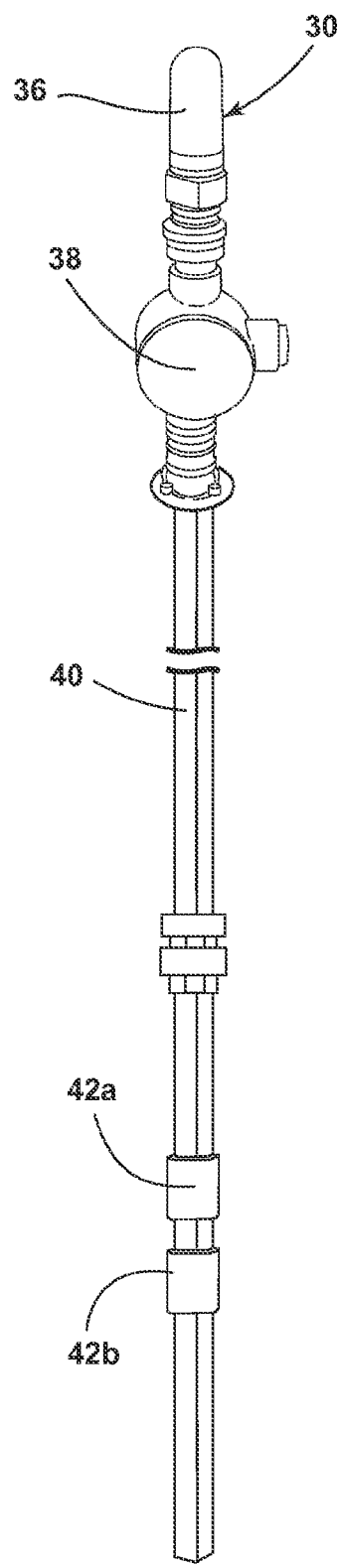
FIG. 3 is perspective view of a wireless tank monitor used in the wireless tank monitor assembly of FIGS. 1 and 2.

Referring now to FIG. 3, a perspective view of the wireless tank monitor unit 30 with level sensor 40 is shown. The monitor unit 30 is generally comprised of a transmitter 36, a housing 38, a level sensor 40, floats 42.

Figure 4:
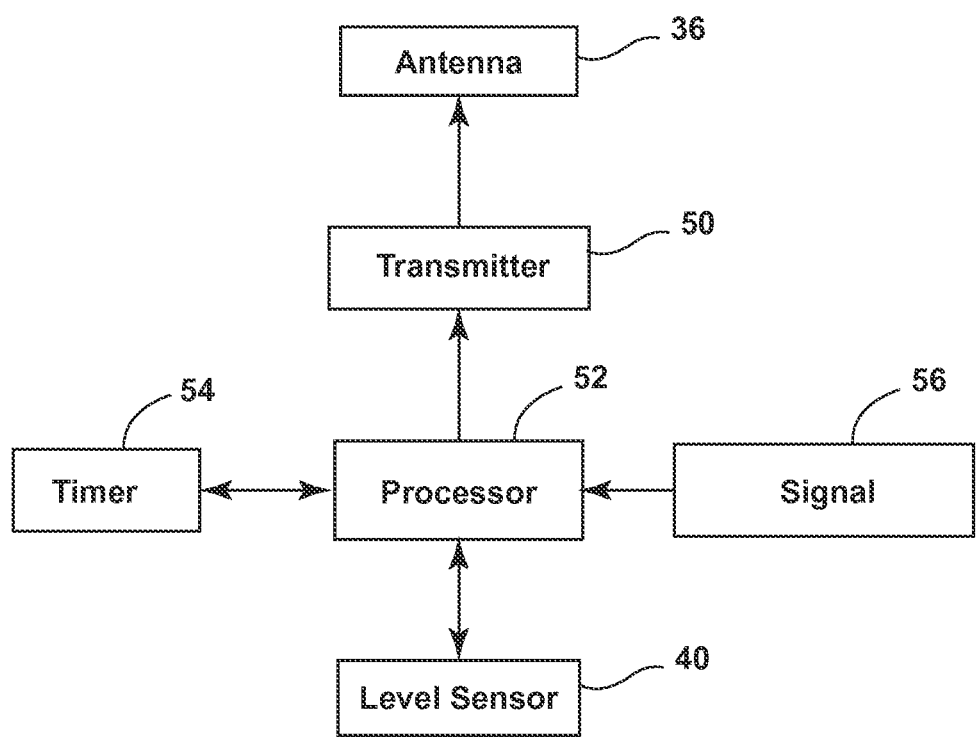
FIG. 4 is a schematic illustration of the hardware operating system for the wireless tank monitor assembly illustrated in FIG. 2.

The housing 38 houses a controller, further described in FIG. 4, to process the signals from the level sensor 40 and transmit the signals via the transmitter 36. The transmitter 36 and monitor 30 are preferably mounted above the top of the tank 12. The height is preferable because it may avoid any physical obstacle on the ground or any other tank 12 which may interrupt or block signal transmission to a monitor link 14.

The level sensor 40 is connected to the housing 38 and is coupled to the tank 12. Two floats 42a, 42b attach to a lower portion of the level sensor 40. As the liquid levels rise and fall, the floats 42a and 42b will rise and fall as well, thereby providing accurate readings of the level in the tank 12. The floats 42 may be density specific for different measurements for different liquids inside of a tank 12. For example, at an oil well site, a tank fills with a mixture of oil and water and as the two liquids separate, a measurement of the quantity of each liquid is desirable.

Referring now to FIG. 4, the internal hardware system of the wireless tank monitor assembly 28 is shown. Initially, the processor 52 operates on a predetermined rate based upon the timer 54, for generating data based on tank level readings by the level sensor 40 and utilizing the transmitter 50 to make transmissions of the data representative of those readings. In a preferred embodiment, the initial predetermined rate would be ten minutes, but may be any time. Based upon the predetermined rate, a timer 54 will count down until it 'wakes up' the processor 52. When the processor 'wakes up,' it becomes operational. Each time the processor 'wakes up' it generates data packets, representative of the level of liquid in the tank as measured by the level sensor. The processor transmits the data packets utilizing the transmitter 50 and the attached antenna 36 to the monitor link 14 associated with the tank 12. The processor 52 and transmitter 50 then both return to 'sleep' until the next scheduled reading based upon the predetermined rate, conserving battery power because they receive no power and are non-operational.

The limit sensors 32a, 32b will signal the processor based upon the rising and falling liquid levels inside of the tank 12. Upon reaching the predetermined upper or lower level, the limit sensors 32a, 32b will send a signal 56 to the processor 52. The processor 52 may take different actions depending on the signal 56 received. For example, actions such as making an immediate reading and transmitting that reading or changing the current predetermined measurement rate, or both, could occur.

In some embodiments, when the upper limit sensor 32a moves to the up position, the signal 56 may instruct the processor 52 to change the predetermined rate to increase to prevent overflow as the tank 12 fills. Additionally, the predetermined rate may decrease, as taking level readings from a full tank 12 may be undesirable. Further, when the switch 32b moves to a down position, the predetermined rate may increase to determine when the tank 12 approaches empty. Additionally, the rate may decrease since measurements of an empty tank may be unnecessary. Particular embodiments depend upon the needs of the particular storage tank 12.

The limit sensors 32a, 32b are important for updating the predetermined measurement rate as conditions within the tank 12 change. Certain conditions may require many level readings to prevent an overflow of the tank as it fills. Additionally, after the tank becomes full, very few readings will be necessary until the tank 12 is emptied. If a spill occurs, the limit sensors 32a, 32b will signal the processor to 'wake up' as the level in the tank falls, increasing the measurement rate and alerting an operator of the condition as it occurs. The system incorporating the limit sensors allows for optimal reading frequency based on the current condition of the tank, simultaneously optimizing and increasing battery life of the system due to the optimal reading frequency.

Figure 5:
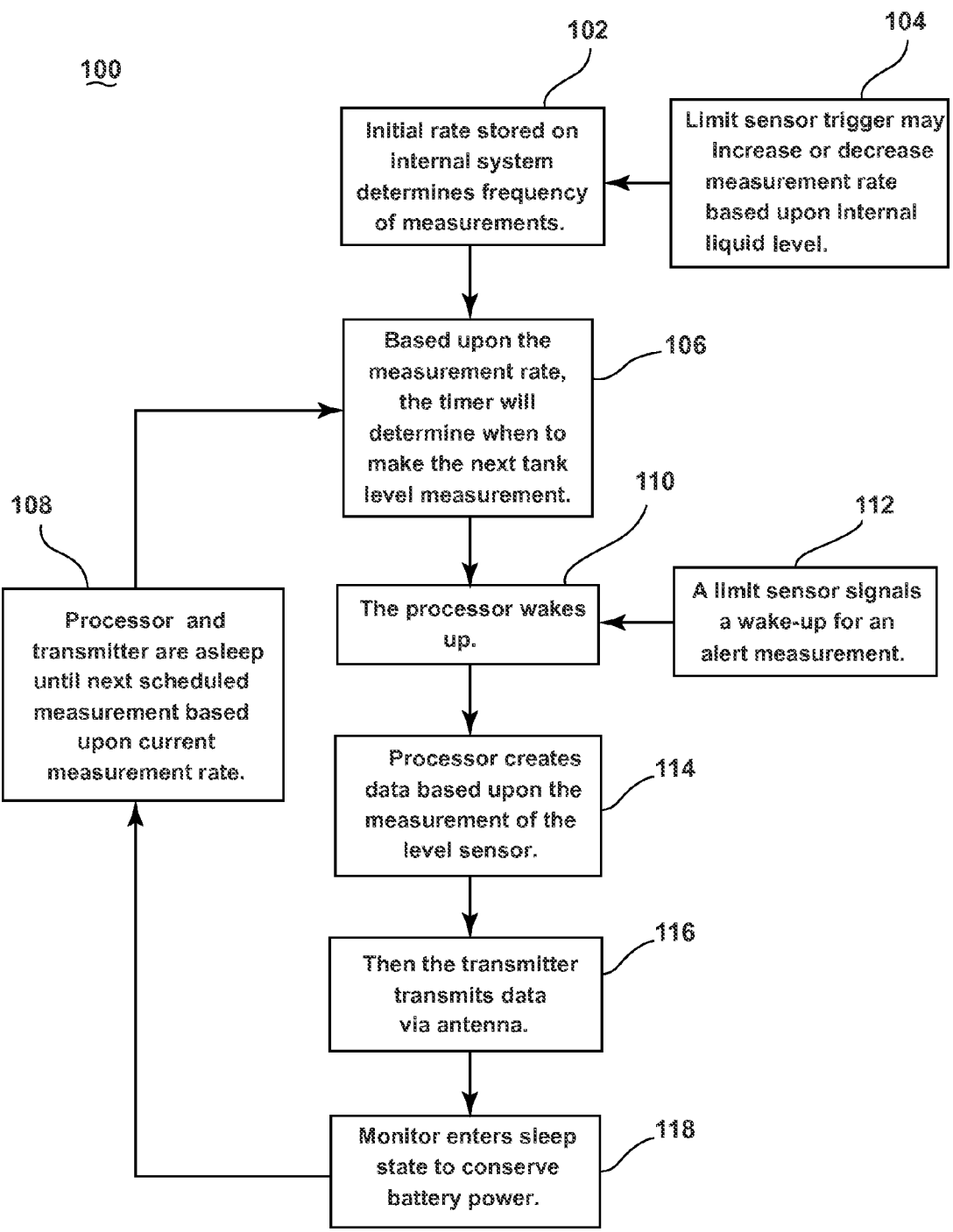
FIG. 5 is a flowchart showing a method of monitoring the level of liquid in a tank according to the invention.

Referring now to FIG. 5, a flowchart showing method of operating the tank monitoring system.

Beginning with step 102, the wireless tank monitor assembly 28 will have a predetermined measurement rate. The predetermined measurement rate is stored on the internal memory and the processor 52, which uses that rate to determine how often the timer will wake the processor 52 to transmit a reading.

At step 104, the predetermined measurement rate is subject to change. The signal sent from a limit sensor 32 may change the predetermined rate. In a preferred embodiment, the tank 12 has two limit sensors 32, one at fifteen feet, and one at five feet in a twenty-foot-tall tank. In one embodiment, when the liquid level inside the tank 12 falls below a predetermined lower level, the knob 44b at five feet will fall, sending a downward signal and the processor 52 may increase the measurement rate to every two minutes. Similarly, as the liquid level rises above an upper predetermined level, the knob 44a at fifteen feet will rise and upper limit sensor 32 will send an upward signal. The processor 52 will receive the signal that the tank 12 is approaching full and may increase the measurement rate of the timer 54 to every 30 seconds to insure that there is not an overflow. As the tank level returns back within the normal range, above five feet and below fifteen feet, the limit sensors 32 will signal the processor to maintain a standard measurement rate.

At step 106, the timer 54 counts down, based upon the current measurement rate, until it is time to make another tank level measurement. When the count is completed, the timer 54 will wake up the processor 52 to generate a data packet based upon the level of liquid in the tank 12.

At step 112, similar to step 104, the liquid level inside the tank 12 is either rising or falling, activating a limit sensor 32. When the liquid level inside of the tank 12 reaches the threshold where one of the knobs 44a, 44b changes position, the limit sensor 32 sends a signal to the processor 52 to wake up. The processor may take this measurement outside of the standard measurement rate specifically to inform an end user of a specific tank status. In addition, the measurement rate may change too.

At step 110, either the timer 54 completes a countdown or a limit sensor 32 signals a measurement threshold, waking the processor 52.

At step 114, the awakened processor 52 generates a data packet, representative of the measurement from the level sensor 40 based upon current position of the float(s) 42. Then, at step 116, the transmitter 50 transmits the data packet generated by the processor 52. At step 118, the wireless tank monitor 30 returns to sleep to conserve power until the next wake up signal from the timer 54 or from a limit sensor 32.

At step 108, the entire wireless tank monitor assembly 28 is in a sleep mode, conserving power and extending battery life. The monitor will remain asleep until the next scheduled measurement based upon the current sampling rate or until a change in liquid level triggers a switch-mode measurement.

Technical benefits of the invention include extension of battery life of wireless tank monitors and enabling the use of smaller batteries, decreasing the size of the monitoring unit. Another benefit of this invention is utilizing a limit sensor system for optimizing a sampling rate, consistently maintaining efficient battery usage. Optimizing the sampling rate enables accurate measurement of the tank at times when a larger or smaller frequency of measurement is required. Optimizing this sampling rate greatly extends battery life. The flexibility to inherently change a sampling rate without outside instruction further conserves battery, as well as preparing for an alert situation such as a tank spill or overflow.

Furthermore, this system may be implemented with a defined 'hopping' system where a signal is transmitted between monitors or nearby relays. This enables conservation of battery life by utilizing a low-power radio signal, preferably in the 900 MHz band.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention.

What is claimed is:

1. A wireless tank monitoring system for monitoring the level of fluid in a plurality of tanks and reporting the level of fluid in each of the plurality of tanks to a data collection center at a remote location, the monitoring system comprising:

a level sensor mounted in each of the plurality of the tanks for sensing the level of a fluid in the corresponding tank;

a processor having a normal sleep mode and an awake mode, and connected to the level sensor for generating, when awake, data packets representative of the level of a fluid in the corresponding tank at a given time as determined by the level sensor;

a transmitter connected to a processor in at least one of the plurality of tanks and configured to receive data packets from another of the plurality of tanks representative of the level of fluid in another of the plurality of tanks and to transmit the data packets from the processor in the corresponding tank and the data packets in the another of the plurality of tanks to the data collection center in a singe data transmission;

a timer connected to the processor and configured to change the mode of the processor to an awake mode at a predetermined frequency to generate data packets representative of the level of fluid in the tank;

at least one limit sensor connected to the processor, mounted to the tank and configured to detect and communicate to the processor a rise of the liquid level in the tank above an upper predetermined level or a fall of the liquid level in the tank below a lower predetermined level; and wherein the processor is programmed to change to the frequency of the awake mode of the processor in response to a communication from the at last one limit sensor that the level of liquid in the tank is either above the upper predetermined level or below the lower predetermined level.

2. The system of claim 1 wherein the at least one monitor is mounted to the upper or lower portion of each of the plurality of tanks.

3. The system of claim 1 wherein the predetermined frequency of the awake mode is increased when the level of fluid in the corresponding tank is above an upper predetermined level or below a lower predetermined level.

4. The system of claim 1 and further comprising a battery connected to the processor in each of the plurality of tanks to provide power to the corresponding processors.

5. The system of claim 1 wherein the limit sensors in each of the plurality of tanks are float sensors.

6. The system of claim 1 wherein the transmitter in each of the plurality of tanks is configured for wireless communication.

7. The system of claim 1 wherein the monitoring system includes a wireless transceiver in each of the plurality of tanks for receiving command signals from the data collection center.

8. The system of claim 1 wherein the processor in each of the plurality of tanks is configured to change the mode of the corresponding processor to an awake mode with command signals from the data collection center; and the processor is configured to generate data packets representative of the level of fluid in the corresponding tank and transmit the data packets to either of a transceiver corresponding to another tank or the data collection center.

9. A method of monitoring a level of fluid in a plurality of tanks in a remote location and reporting the level of fluid in each of the tanks to a data collection center, comprising steps of:

periodically measuring the level of fluid in each of the plurality of tanks at corresponding predetermined frequencies;

detecting a condition in the tank when the fluid is at least one of above a predetermined upper level and below a predetermined lower level;

increasing the frequency of the measuring the level of fluid in the tank and increasing the frequency of transmitting the data packets when the detected condition is one of above the predetermined upper level and below a predetermined lower level; and transmitting data packets representative of the level of fluid in the tank via a transceiver to the transceiver corresponding to another of the tanks so that data packets from a plurality of tanks can be sent to the data collection center in a single transmission.

10. The method of claim 9 wherein the data packets are transmitted wirelessly.

11. The method of claim 9 wherein the periodic measuring act and the detecting a condition act are carried out by different instruments.

* * * * *